United States Patent Office 3,120,016
Patented Feb. 4, 1964

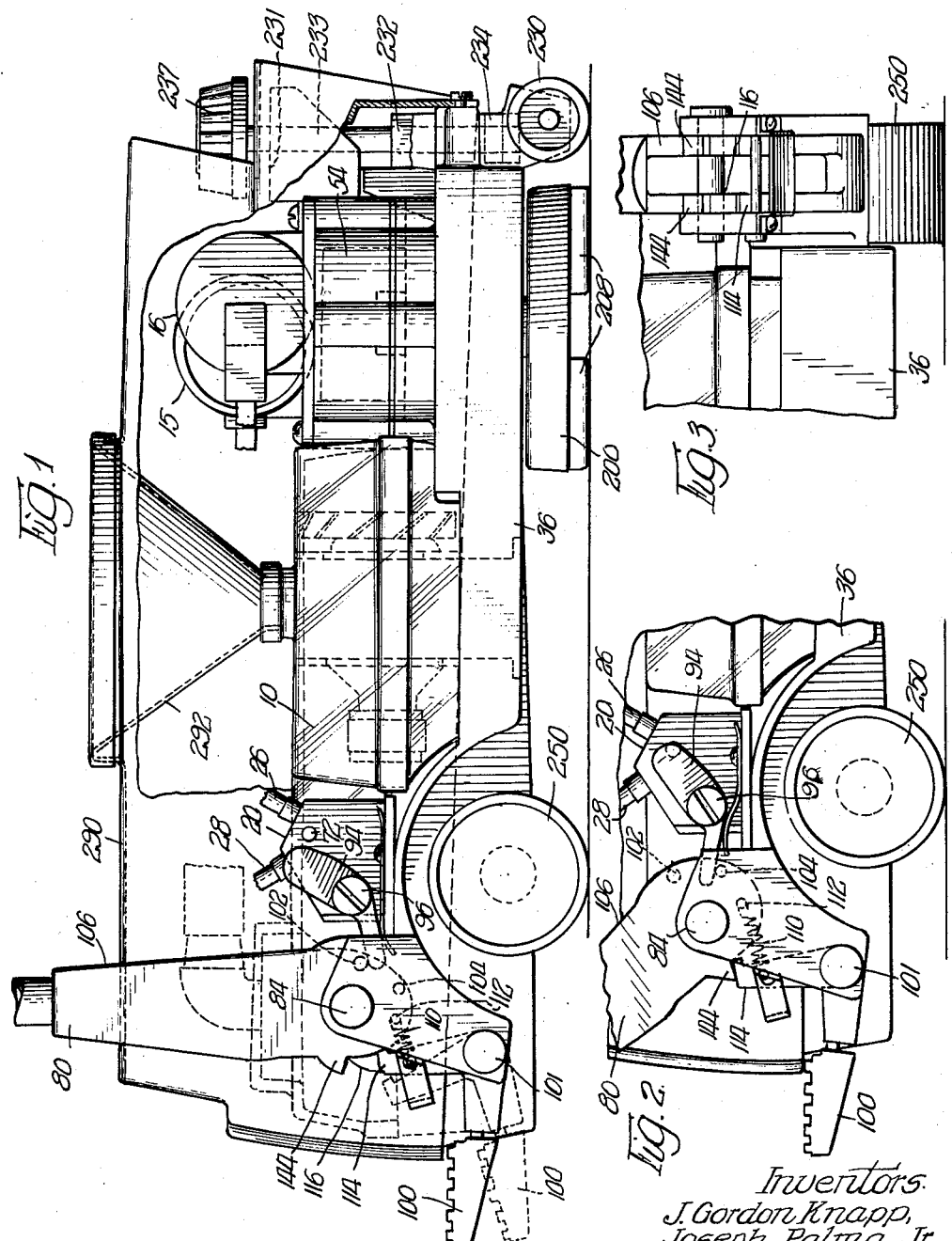

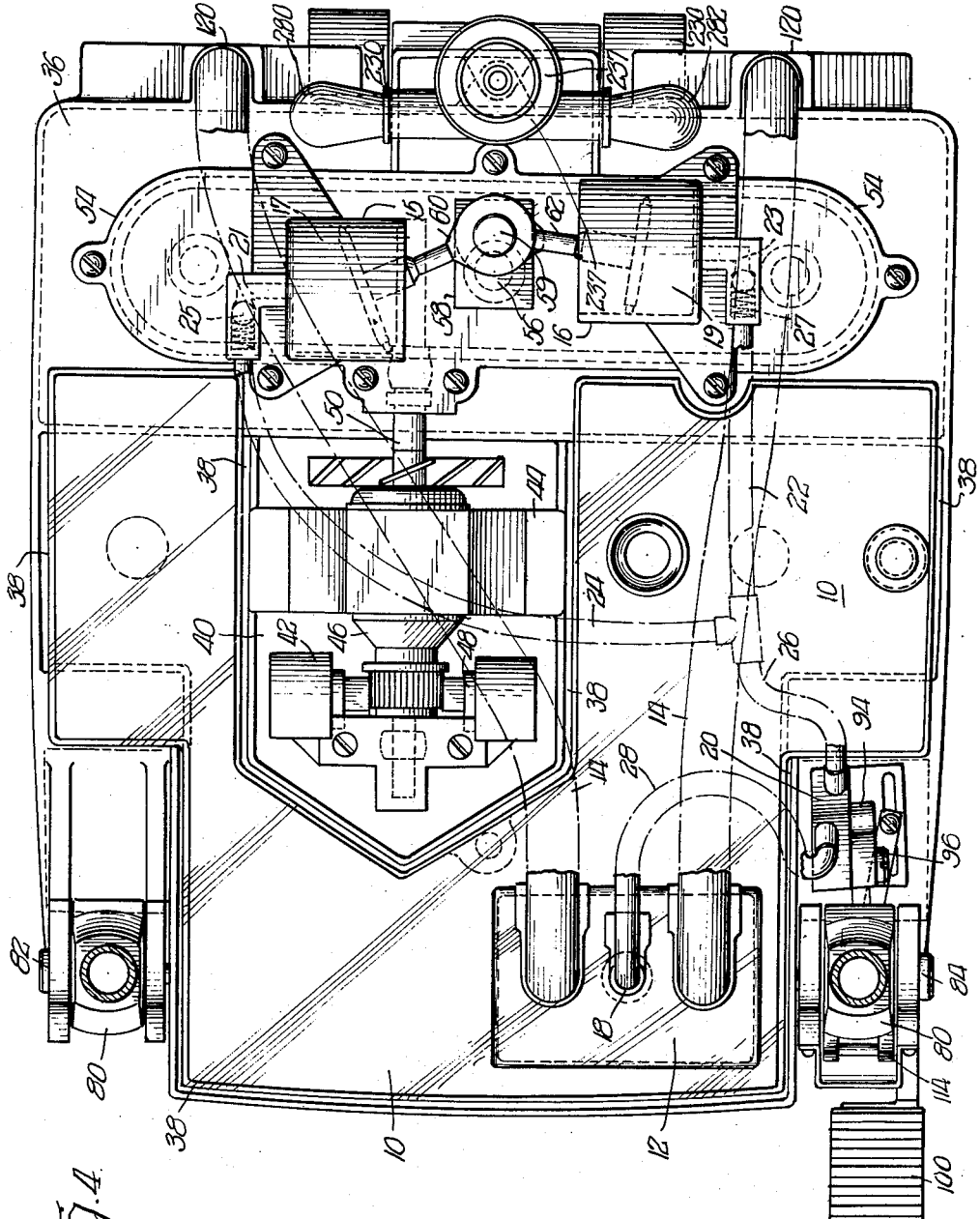

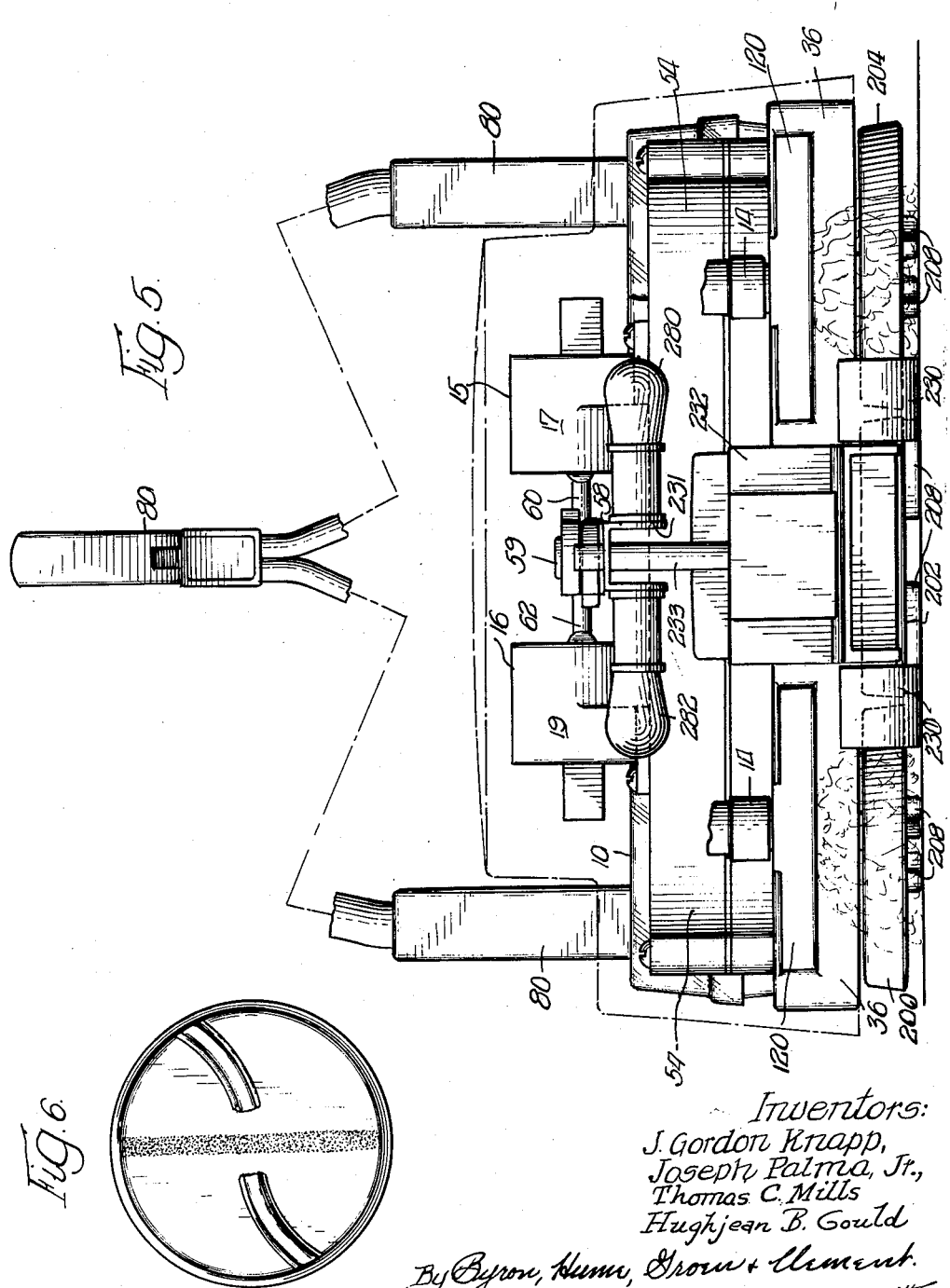

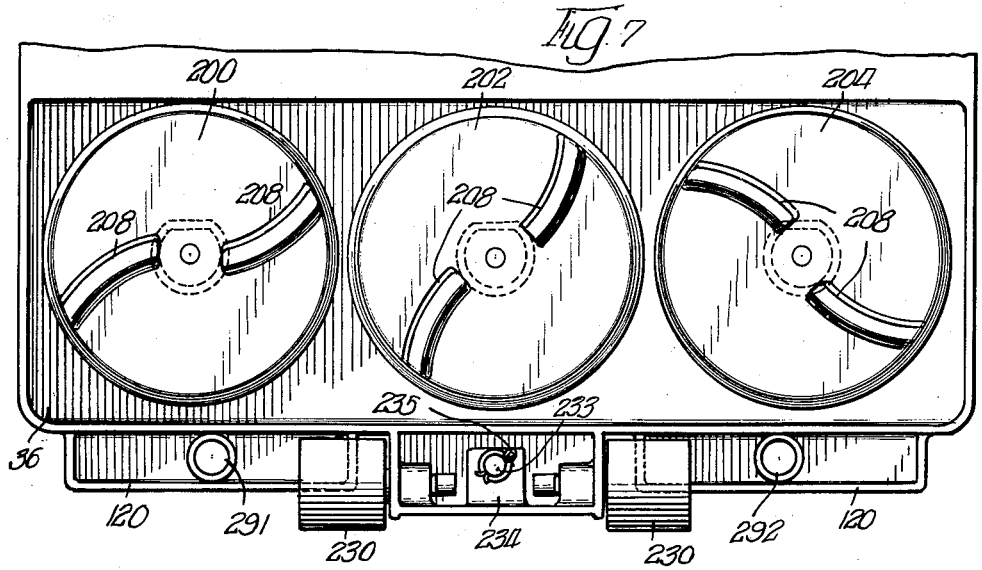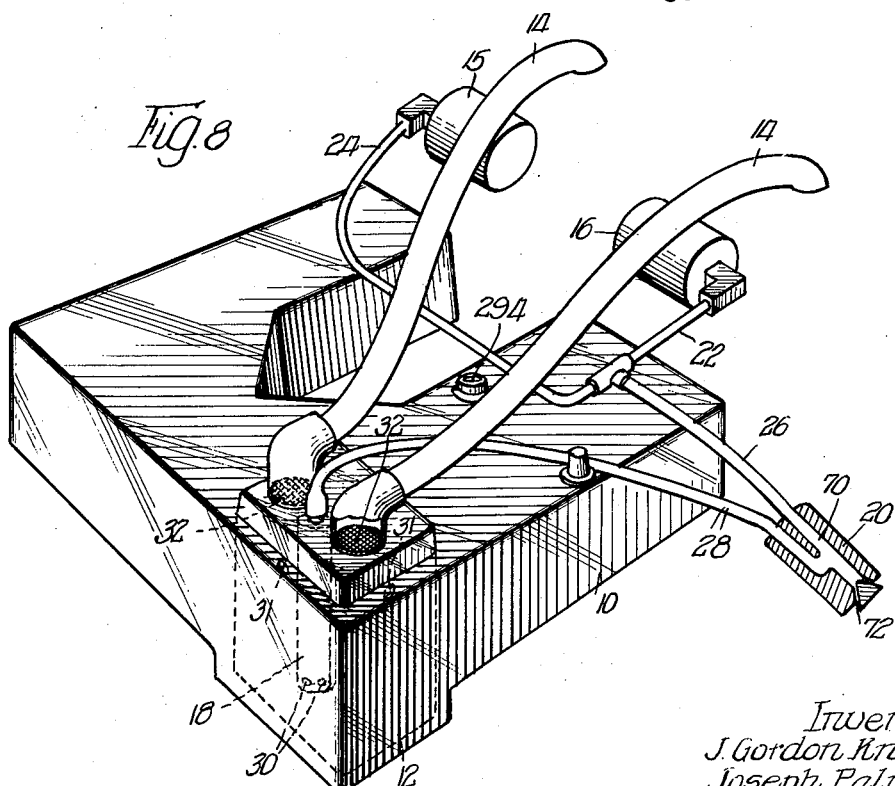

3,120,016
RUG SHAMPOO MACHINE
J. Gordon Knapp, 322 E. Union, and Joseph Palma, Jr., O N. 487 Willow Road, both of Wheaton, Ill., Thomas C. Mills, Wheaton, and Hughjean B. Gould, Berwyn, Ill.; said Mills and said Gould assignors to said Knapp and said Palma
Filed Dec. 23, 1960, Ser. No. 84,474
3 Claims. (Cl. 15—98)

This invention relates in general to a machine for cleaning rugs, carpets and the like in place on floors and the machine may be readily adapted for similar uses as polishing, buffing and the like.

It is an object of this invention to provide a cleaning machine that applies a controlled cleansing foam to the surface to be cleaned so as to prevent excessive wetting of the surface to be cleaned.

It is another object of this invention to provide a cleaning machine that generates a controlled cleansing foam and applies the foam to the surface to be cleaned so as to prevent excessive wetting of the surface to be cleaned.

It is another object of this invention to provide a cleaning machine that generates a controlled cleansing foam and selectively applies the cleansing foam to the surface to be cleaned so as to prevent excessive wetting of the surface to be cleaned.

It is an object of this invention to provide a cleaning machine that generates a controlled cleansing foam which may be applied to the surface to be cleaned under the direction of the operator of the machine so as to prevent excessive wetting of the surface to be cleaned and wherein the machine is also provided with massaging pads that gently work the foam into the surface to be cleaned so as to reduce excessive wear of the surface to be cleaned.

It is another object of this invention to provide a cleaning machine particularly adaptable for the cleaning of carpets and rugs and the like that generates a controlled cleansing foam and applies the cleansing foam to the surface to be cleaned so as to prevent excessive wetting of the surface to be cleaned and wherein the generated foam is sized in the machine so as to insure the application of foam bubbles of predetermined sizes.

It is a further object of this invention to provide a cleaning machine particularly suitable for cleaning rugs, carpets and the like that generates its own foam and wherein the generated foam is sized to prevent excessive wetting of the surface to be cleaned and wherein only controlled foam is applied to the surface to be cleaned. The cleaning machine is further provided with massaging pads that gently scrub the surface to be cleaned so as to prevent wearing of the surface to be cleaned by the cleaning machine itself.

It is a further object of this invention to provide a cleaning machine of the type described wherein foam is generated by an aerator and a foam chamber and wherein the entire aerator is self contained in the cleaning machine.

It is a more specific object of this invention to provide a cleaning machine particularly suitable for cleaning rugs, carpets and the like, in place on floors that is movable over the surface to be cleaned and that is adapted for cleaning in small corners and other areas where access is normally difficult.

Briefly, in a preferred embodiment of the invention the cleaning machine is designed to be operated by relatively unskilled operators for use in the home or office or the like and is moved over the surface to be cleaned with little difficulty. The cleaning machine is self-contained and requires only a source of energy as, for example, electrical power from any convenient outlet and an appropriate cleansing solution. A comparatively dry, controlled foam is generated in the cleaning machine and selectively applied to the surface to be cleaned. Massaging pads are provided in the cleaning machine to gently massage the surface to be cleaned so as to reduce the wear of the surface to be cleaned. Control means are provided whereby the operator may selectively apply the cleansing foam to the surface to be cleaned and the machine is further arranged to be usable where access is normally difficult. Other features are provided to insure against the scratching of furniture and to provide means for adjusting the pressure of the massaging pads on the surface to be cleaned and the like as will be seen. The cleaning machine is versatile and is not limited to the cleaning of rugs, carpets and the like and may be readily adapted for scrubbing and polishing floors and the like.

Other objects and features of the invention, including more detail of the objects and features already recited, will become more apparent if the following is viewed in light of the drawings, in which:

FIGURE 1 is a partially cut-away side elevational view of a cleaning machine embodying the features of the invention;

FIGURE 2 is an enlarged fragmentary view of a portion of the cleaning machine illustrated in FIGURE 1 and specifically illustrates a portion of the means utilized to selectively control the application of foam to the surface to be cleaned;

FIGURE 3 is an enlarged fragmentary view illustrating a rear view of the portion of the cleaning machine illustrated in FIGURE 2;

FIGURE 4 is a plan view of the cleaning machine illustrated in FIGURE 1 with the cover removed;

FIGURE 5 is a partially cut-away fragmentary front elevational view of the cleaning machine illustrated in FIGURE 1;

FIGURE 6 is a plan view of an alternative massaging pad which may be utilized with a machine embodying the features of the invention;

FIGURE 7 is an enlarged fragmentary bottom view of the machine illustrated in FIGURE 1; and FIGURE 8 is a somewhat diagrammatical view illustrating the foam generating and sizing system utilized in a cleaning machine embodying the features of the invention.

Referring to the drawings, there is illustrated a cleaning machine particularly adaptable to the cleaning of rugs, carpets and the like in place on the floor in homes, offices and so forth. The cleaning machine is a self-contained unit and need only be supplied with electrical energy from any convenient electrical outlet and appropriate cleansing solution. A relatively dry and sized cleansing foam is generated by the cleaning machine and applied to the surface to be cleaned. The cleansing machine is then positioned such that the applied foam is gently massaged into the surface to be cleaned if, for example, a rug, carpet or the like is involved. The cleansing foam removes dirt from the surface to be cleaned and the cleansing foam and the dislodged dirt settle out as particles which may be removed by means of a vacuum cleaner or the like.

The cleaning machine can be considered for purposes of explanation to comprise means for generating and applying a relatively dry and sized cleansing foam, means for massaging the foam into the surface to be cleaned and carriage means carrying the last two mentioned means including means for moving and guiding the cleaning machine over the surface to be cleaned.

One of the dangers involved in cleaning a surface such as a rug, carpet or the like is that the cleansing solution may excessively wet the rug or carpet. Cleansing solutions dispensed in the form of cleansing foam is a distinct improvement, however, it has been observed that more wetting of the rug or carpet occurs if the cleansing foam bubbles are large inasmuch as they have a tendency to break quite easily. It has been found that sizing the foam particles has reduced the wetting of the rug or carpet surfaces. On the other hand, it has been observed that foam particles of too fine or small a size do not clean the surface to be cleaned as effectively as larger size foam particles. There appears to be an optimum range and this range will vary under different conditions of wetting.

Referring now to FIGURE 8 for a diagrammatical representation of the means for generating and applying a relatively dry and sized cleansing foam to the surface to be cleaned, there is illustrated: a main reservoir 10 for storing the cleansing solution before foaming and applying the foam to the surface to be cleaned; a foam forming chamber 12 wherein the cleansing solution is foamed and sized; a pair of foam dispensing tubes 14 connected to the upper portion of the foam forming chamber 12; a pair of sizing screens 32 positioned at the inlets to the pair of foam dispensing tubes 14 and means for causing foam to be generated in the foam forming chamber 12 comprising, a pair of air compressors 15 and 16, a foam forming tube 18 connected to the pair of air compressors and positioned within the foam forming chamber 12, a by-pass valve 20 regulatable to stop or start the formation of foam within the foam forming chamber 12, and interconnecting pneumatic lines interconnecting the pair of air compressors 15 and 16, the by-pass valve 20 and the foam forming tube 18.

Air is compressed in the air compressors 15 and 16 and transmitted over the tubes 22, 24 and 26, the by-pass valve 20 and the tube 28 to the foam forming tube 18. The foam forming tube 18 is completely enclosed except for a connection to tube 28 and a plurality of small apertures 30 positioned adjacent the lower end of the foam forming tube 18. The compressed air escapes through the apertures 30 and bubbles up through the cleansing solution thereby forming bubbles of foam which rise to the top of the foam forming chamber 12. Bubbles are then collected in the foam forming chamber 12 and the foam begins to flow out through the dispensing tubes 14 attached to the upper end of the foam forming chamber 12. However, the size of the foam bubbles which may enter the foam dispensing tubes 14 is determined by the size of the screens 32 positioned at the inlets of the foam dispensing tubes 14, the fineness of the mesh of the screens 32 determines the maximum bubble size that the foamed cleansing solution may have inasmuch as bubbles of foam over the dimensions of the screen mesh 32 will be divided at the screens 32. In one preferred embodiment of the cleaning machine it was observed that screens designated as 50 mesh screens were very effective in cleaning rug and carpet surfaces and the like. Additionally a plurality of apertures 31 are positioned adjacent the top of the foam forming chamber 12 so as to maintain pressure equalizing of the foam forming chamber 12.

Referring now to FIGURES 1 through 5, the components of the means for generating and applying a relatively dry and sized cleansing foam diagrammatically illustrated in FIGURE 8 are shown mounted on the carriage of the cleaning machine. The carriage of the cleaning machine comprises a substantially rectangular in plan body member 36. The body member 36 has formed therein a recess 38 shaped substantially the same as the reservoir 10 best illustrated in FIGURES 4 and 8, and the reservoir 10 is securely fastened in a nested relationship within the recess 38 of the body member 36 of the carriage by any convenient means.

Positioned within an additional recess 40 in the body member 36 of the carriage is an electrical motor 42 comprising a stator 44, rotor 46 and commutator means 48. The electrical motor 42 is connected to source of electrical power (not shown) and the rotor 46 having the shaft 50 attached thereto provides the power for the cleaning machine.

The rotatable drive shaft 50 of the electric motor 42 is connected to a gear arrangement (not shown) positioned within the gear box 54. The gear arrangement mounted in the gear box 54 provides the moving power for the air compressors 15 and 16 and specifically by rotating a shaft 56 extending from the gear box 54. The shaft 56 has attached thereto a drive arm 58 which rotates in unison with the drive shaft 56. Pivotably connected to the drive arm 58 at a point radially displaced from the drive shaft 56 by means of pin 59 are the air compressor pistons 60 and 62, respectively as best seen in FIGURE 4.

It can be seen that the air compressors 15 and 16 each comprise a compression or piston housing 17 and 19, respectively. Each piston housing 17 and 19 has provided therein an outlet for compressed air 21 and 23, respectively. The check valves 25 and 27 are each comprised of a spring, ball valve and ball valve seat arrangement well known to those skilled in the art which permits the flow of compressed air in only one direction.

The air compressors 15 and 16 are designed to provide compressed air to the form forming tube 18 positioned in the foam forming chamber 12. The pistons 60 and 62 of the air compressors 15 and 16 move so as to periodically trap air between the pistons 60 and 62 and the piston housings 17 and 19 and then compress that air and deliver the compressed air through the one way valves 25 and 27, respectively. The compressed air then flows through the by-pass valve 20 where the by-pass valve is manipulated to either transmit the compressed air to the atmosphere or to the foam forming tube 18.

The position of the piston housing 17 and 19, the drive arm 58 attached to the shaft 56, and the pivot point on the drive arm 58 of the pistons 60 and 62 are so designed that the pistons 60 and 62 have two directions of movement, one direction being the linear movement in and out of the piston housings 17 and 19 and the other movement being a rotational movement. In the particular embodiment of the invention illustrated in the drawings, the piston 60 when in its compression stroke rotates clockwise as seen in FIGURE 4 and in its outward stroke rotates in a counter-clockwise direction as seen in FIGURE 4, the object being to rotate the piston 60 such that air may be periodically trapped between the piston 60 and the inside portion of the piston housing 17 and then compressed. The rotational movement of the shaft 56 and the drive arm 58 will cause the compressor 15 to be in a compression stroke for substantially half the time.

The piston 62 also rotates in a clockwise direction as seen in FIGURE 4 on the compression stroke and in a counter-clockwise direction on the outward stroke as seen in FIGURE 4. However, when the piston 62 is a compression stroke the piston 60 is in an outward stroke thus insuring that compressed air will be continually delivered to the by-pass valve 20. The one way check valves 25 and 27 insure that compressed air will only pass out through the valves 25 and 27 into the lines 22 and 24 through the pneumatic line 26 and through the by-pass valve 20.

The by-pass valve 20 is comparatively simple in configuration and merely comprises a passage 70 diagrammatically illustrated in FIGURE 8 but not shown in the other drawings having an input pneumatic tube 26 and an output pneumatic tube 28. An aperture 72 is positioned within the passage 70 of the valve 20 and whenever the passage 70 is vented to the atmosphere compressed air is not delivered to the foam forming tube 18 and no additional foam is formed.

In the illustrated embodiment of the invention a bypass valve 20 is manipulated from its open position to its closed position and vice versa by use of the bifurcated handle 80 of the cleaning machine. The by-pass valve 20 is in its open position when the passage 70, diagrammatically illustrated in FIGURE 8, is vented to the atmosphere through the aperture 72 and therefore no compressed air is delivered to the foam forming tube 18. The by-pass valve 20 in its closed position when the passage 70 is not vented to the atmosphere through the aperture 72 and air under pressure is delivered to the foam forming tube 18. The cleaning machine handle 80 is movable into a plurality of positions and one extreme position (not shown) will be parallel to the body member 36 of the carriage and in this position is suitable for hanging in a closet or the like.

A cam follower 94 illustrated in FIGURES 1 and 2 is pivotably secured to the by-pass valve 20 by any convenient means such as securing pin 96. One leg 106 of the bifurcated handle 80 is itself bifurcated and provided with a series of stops engaged by a bifurcated foot operated latch member 100. The cam follower 94 extends into an opening provided therefor in the leg 106 of the bifurcated handle 80 and the pair of camming pins 102 and 104 are positioned within the leg 106 of the handle 80 and are adapted to move the cam follower 94 back and forth so as to alternately block and open the passage 70 of the by-pass valve 20 to the atmosphere.

The foot operated latch member 100 is pivotably attached to the body member 36 of the carriage by a pivot pin 101 and is provided with a biasing spring 110 which is secured to the body member 36 of the carriage by any convenient means such as pin 112. Therefore, the foot operated latch member 100 is biased toward the right as seen in FIGURES 1, 2 and 4 and will so move unless prohibited by a surface on the leg 106 of the bifurcated handle 80 or else when the foot operated latch 100 is depressed by the foot of an operator.

Assume that the handle 80 is in an upright position as shown in FIGURE 1 and the by-pass valve 20 is open inasmuch as the aperture 72 is vented to the atmosphere, the handle 80 is held in its upright position by means of one of the upper portions 114 of the foot latch member 100 which supports the handle 80 on the under side of the tooth portion 116 of the leg 106 of the cleaning machine handle 80. If it is desired to produce foam, the by-pass valve 20 is then closed and the closing of the by-pass valve 20 may occur by lowering the handle 80 of the cleaning machine to an operative position. The foot actuated lever 100 is depressed as indicated in phantom in FIGURE 1 and the handle 80 is rotated in a counterclockwise direction as viewed in FIGURE 1. The tooth portion 116 of the handle 80 is now free of the upper portion 114 of the latch member 100 and freely rotates.

The camming pin 104, after a predetermined rotational travel, will engage the cam follower 94 and rotate the cam follower in a clockwise direction to rotate the cam follower 94 to a position where the cam follower 94 blocks the aperture 72 and consequently the escape of compressed air from the passage 70 of the by-pass valve 20 such as illustrated in FIGURE 2. In this position the upper portion 114 of the foot actuated lever 100 will engage the under side of teeth 144 and the handle 80 will be held in that position until either the foot operated latch 100 is released or the handle 80 rotated in a clockwise direction as seen in FIGURES 1 and 2 to either return the handle 80 to its upright position or to place the handle 80 in a plane parallel to the plane of the body member 36 of the carriage.

It should be appreciated that if it is desired to return the handle 80 to its upright position as illustrated in FIGURE 1 that the cam follower will not move until camming pin 102 has rotated a predetermined amount. Therefore, it should be apparent that once the by-pass valve 20 is either closed or opened the handle 80 may be moved over a predetermined rotational range without disturbing the condition of the by-pass valve 20. This, of course, aids the cleaning machine operator utilizing the cleaning machine.

Alternative schemes such as a switch-solenoid arrangement with the switch located in the handle for opening and closing the by-pass valve 20 appear to be within the inventive scope of the invention.

When the electric motor 42 is energized and the by-pass valve 20 is closed, foam is generated in the foam generating chamber 12 and transmitted through the sizing screens 32 and the dispensing tubes 14 and out through the opening of the dispensing tubes 14 near the lip portion 120 of the body member 36 of the carriage as best seen in FIGURE 5.

As previously stated, after the relatively dry, sized cleansing foam has been applied to the surface to be cleaned the cleaning machine is positioned such that the cleansing foam is gently massaged into the surface to be cleaned. The massaging of the cleansing foam into the surface to be cleaned is accomplished in the illustrated embodiment of the invention by means of three rotatable disc members 200, 202 and 204, respectively. The massaging pads 200, 202 and 204 are rotatably driven by a gear arrangement (not shown) provided in the gear housing 54, connected to the rotating shaft 50 of the motor 42.

The massaging discs 200, 202 and 204 may be connected by any gearing arrangement found suitable for the task and in the preferred embodiment of the invention are arranged to all rotate in a counter-clockwise direction as viewed in FIGURE 7. The massaging discs 200, 202 and 204 are each provided with a pair of curved depending ribs 208, extending radially from the axis. The rotating massaging discs may be comprised of any suitable plastic material or other suitable material which will not rip or wear the fabric of the rug or carpet or the like being cleaned thereby causing deterioration of the rug. The massaging discs are preferably detachably secured to the gearing means (not shown) provided therefore and may be readily removed by the operator.

An alternate disc form is illustrated in FIGURE 6 and the disc illustrated in FIGURE 6 is substantially the same as the disc illustrated in FIGURE 7 with the exception that a single straight row of bristles bisecting the depending curved ribs 208 is additionally provided. Said row of bristles may be fixed or removable by means of a slot or track. This enables the massaging discs to contribute additional scrubbing power whenever the scrubbing power is desired.

It should be readily understandable that any type of discs can be used with the cleaning machine and the discs can be straight bristled discs, steel wool or whatever is deemed necessary. The invention is certainly enhanced by, but not restricted, by the use of the massaging discs.

The carriage of the cleaning machine is provided with a pair of rear wheels 250 pivotably secured to the body member 36 of the carriage in order to readily move the cleaning machine over the surface to be cleaned. Inasmuch as the massaging discs 200, 202 and 204, respectively, are positioned adjacent the front end of the cleaning machine, the provision of front wheels is not necessary for mobility.

However, adjustable front wheel means 232 are provided to adjust the pressure that the massaging discs 200, 202 and 204 apply to the surface to be cleaned and this means comprises a front set of rollers 230 attached to a vertically movable bracket 232. The vertically movable bracket 232 is attached to the body member 36 of the carriage by a mounting bracket 231 adequately secured to the body member 36 at the top of the body member 36 and by means of a mounting bracket 234 integrally formed and extending from the bottom of the body member 36 of the carriage.

The front rollers 230 are adjusted by means of a threaded shaft 233 pivotably attached to the bracket 234 by cotter pin 235 and extending up through bracket 231 and having attached thereto at the upper end thereof a front roller adjusting knob 237. A mating threaded portion (not shown) is positioned in the vertically movable bracket 232 and the rollers 230 are adjusted in height by turning the knob 237 thus controlling the pressure that the massaging discs 200, 202 and 204 exert on the surface to be cleaned.

The cleaning machine is also provided with a pair of lamps 280 and 282 conveniently positioned at the front of the cleaning machine and provided so as to enable the operator to see immediately in front of the machine as when working in dark corners and the like. The lamps 280 and 282 may be electrically connected to an electric power outlet by any convenient means. Additionally a cover 290 is provided for the cleaning machine and the cover is provided with a funnel section 292 which extends from the top of the cover 290 to the filling aperture 294 of the main reservoir 10. A stopper (not shown) may be positioned in the filling aperture 294 to seal the reservoir 10 to avoid any overflow of the cleansing solution during use of the cleaning machine. The function of the funnel 292 is to aid in the filling of the main reservoir 10 and to avoid any spillage which could possibly damage the cleaning machine. The cover 290 is provided with slots (not shown) through which the light from the lamps 280 and 282 may be transmitted so as to preserve the usefulness of the lamps 280 and 282. A rubber bumper (not shown) may be conveniently attached to the body member 36 or cover 290 to avoid scratching furniture and the like.

*Operation*

Initially the cleaning machine is removed from its storage area and the main reservoir 10 inspected and, if required, the reservoir 10 is refilled with cleansing solution. The funnel shaped portion 292 of the cover 290 aids significantly in refilling inasmuch as little, if any, spilling will occur. The motor is then connected electrically to any convenient electrical outlet (not shown) and if desired, switch means (not shown) are provided on the cleaning machine intermediate the electrical outlet and the electric motor 42. Also electrical means (not shown) are provided to energize the lamps 280 and 282.

The cleaning machine is then positioned on the surface to be cleaned and the front rollers 230 are adjusted by means of the knob 237 so as to adjust the pressure which the massaging discs 200, 202 and 204 exert on the surface to be cleaned. The handle 80 is then manipulated so that the aperture 72 of the by-pass valve 20 is blocked from the atmosphere and foam generation occurs. The electrical motor 42 through its drive shaft 50 and the gearing (not shown) in the gear housing 54 drives the massaging discs 200, 202 and 204 in a counter-clockwise direction as seen in FIGURE 7 and at the same time the air compressors 15 and 16 pump air under pressure into the pneumatic lines 22 and 24 and thereafter into the pneumatic line 26 through the by-pass valve 20 and through the pneumatic line 28 into the foam forming tube 18 in the foam forming chamber 12 in the main reservoir 10.

The compressed air escapes through the aperture 30 provided in the foam forming tube 18 and bubble up thru the cleansing solution thereby generating cleansing foam. The pressure in the foam forming chamber 12 and tank 10 is equalized by the air pressure escape holes 31. The accumulation of foam in the foam forming chamber 12 causes foam to be pushed through the sizing screens 32 positioned in the inlet of the foam dispensing tubes 14.

Any foam bubble larger than the size of the mesh of the screens 32 will be divided, reduced or burst and therefore only foam bubbles of a size less than the size of the mesh of the screens 32 can move into the foam dispensing tubes 14. The foam is then moved thru the foam dispensing tubes 14, as more foam is created in the foam forming chamber 12, toward the front of the cleaning machine and out through the apertures 291 and 292 formed in the body member 36 of the carriage, as best shown in FIGURES 5 and 7. Comparatively dry and sized foam will be dispensed adjacent the front of the cleaning machine and the cleaning machine is then positioned by the operator such that the massaging pads 200, 202 and 204 will gently massage the cleansing foam into the surface to be cleaned.

If at any time it is decided that enough cleansing foam has been spread on the surface to be cleaned, the operator merely stops generation of foam by opening by-pass valve 20 causing the compressed air to be vented to the atmosphere and therefore foam to cease to be formed and applied to the surface to be cleaned.

After the cleansing foam has been gently massaged into the surface to be cleaned the surface is allowed to dry and the macroscopic foam and dirt particles are removed by means of a vacuum cleaner or the like.

It should be apparent that the cleaning machine can have many varied uses, for example, the surface to be cleaned may be a hard floor and therefore the massaging discs could be replaced by hard bristle brushes and so forth.

It should be apparent that modifications and alterations may be made in the embodiment of the invention illustrated in the drawings without departing from the true spirit and concept of the invention. Therefore, it is intended that the claims which follow cover all such modifications and alterations.

What is claimed is:

1. In a surface cleaning machine: a driven shaft, compressor means energized responsive to said driven shaft for providing an output gas under pressure, a reservoir for storing cleaning solution, means for connecting said reservoir with said output gas under pressure whereby foam is generated in said reservoir, output means for said foam whereby said foam is delivered to the surface to be cleaned, sizing means associated with said output means for preventing foam exceeding a predetermined size from being delivered to said foam output means, and massaging means connected to said driven shaft and responsive thereto for gently massaging said foam into the surface to be cleaned.

2. In a surface cleaning machine: a driven shaft, compressing means energized responsive to said driven shaft for providing an output gas under pressure, a reservoir for storing cleaning solution, means for connecting said reservoir with said output gas under pressure whereby foam is generated in said reservoir, output means for said foam whereby said foam is delivered to the surface to be cleaned, output means for said output gas under pressure, sizing means associated with said foam output means for preventing foam exceeding a predetermined size from being delivered to said output means and a massaging pad connected to said driven shaft and responsive to said driven shaft to massage said foam into said surface to be cleaned, said massaging pad being substantially disc-shaped and having dependent ribs adapted to gently massage the foam into the surface to be cleaned.

3. In a surface cleaning machine, the structure as set forth in claim 2, further including valve means for selectively admitting said output gas under pressure to said reservoir, a handle pivotally attached to said surface cleaning machine, said handle cooperating with said valve means, the position of said handle controlling said valve means for selectively admitting said output gas under pressure to said reservoir.

(References on following page)

References Cited in the file of this patent

UNITED STATES PATENTS

| | | |
|---|---|---|
| 1,457,895 | Campanella | June 5, 1923 |
| 1,498,255 | Winchester | June 17, 1924 |
| 1,596,041 | Young | Aug. 17, 1926 |
| 1,889,164 | Wager | Nov. 29, 1932 |
| 2,198,322 | von Schrader | Apr. 23, 1940 |
| 2,238,449 | Peters | Apr. 15, 1941 |
| 2,407,408 | Erickson | Sept. 10, 1946 |
| 2,575,675 | Morgan | Nov. 20, 1951 |
| 2,585,092 | Conto | Feb. 12, 1952 |
| 2,819,478 | Sutton | Jan. 14, 1958 |
| 2,829,874 | Freeman | Apr. 8, 1958 |
| 2,887,275 | Dixon | May 19, 1959 |
| 2,908,334 | Duggan et al. | Oct. 13, 1959 |